United States Patent
Cha et al.

(10) Patent No.: US 9,851,606 B2
(45) Date of Patent: Dec. 26, 2017

(54) LIQUID CRYSTAL DISPLAY DEVICE

(71) Applicant: Samsung Display Co., Ltd., Yongin-si, Gyeonggi-Do (KR)

(72) Inventors: Taewoon Cha, Seoul (KR); Sanghyun Yun, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 2 days.

(21) Appl. No.: 14/921,478

(22) Filed: Oct. 23, 2015

(65) Prior Publication Data

US 2016/0116772 A1 Apr. 28, 2016

(30) Foreign Application Priority Data

Oct. 24, 2014 (KR) ........................ 10-2014-0145325

(51) Int. Cl.
*G02F 1/1339* (2006.01)
*G02F 1/1337* (2006.01)
*G02F 1/1335* (2006.01)
*G02F 1/1333* (2006.01)

(52) U.S. Cl.
CPC .......... *G02F 1/1339* (2013.01); *G02F 1/1337* (2013.01); *G02F 1/13394* (2013.01); *G02F 1/133512* (2013.01); *G02F 2001/133388* (2013.01)

(58) Field of Classification Search
CPC . G02F 2001/13396; G02F 2001/13398; G02F 1/13394; G02F 1/1337
See application file for complete search history.

(56) References Cited

U.S. PATENT DOCUMENTS

| 7,102,723 | B2 | 9/2006 | Byun et al. | |
|---|---|---|---|---|
| 9,207,494 | B2* | 12/2015 | Lee | G02F 1/1337 |
| 2005/0099577 | A1* | 5/2005 | Lee | G02F 1/13394 349/155 |
| 2008/0137022 | A1* | 6/2008 | Komeno | G02F 1/1337 349/153 |
| 2009/0014736 | A1 | 1/2009 | Ibbetson et al. | |
| 2010/0309416 | A1* | 12/2010 | Gotoh | G02F 1/133514 349/123 |
| 2011/0013125 | A1* | 1/2011 | Lee | G02F 1/133711 349/106 |
| 2011/0176097 | A1* | 7/2011 | Shiromoto | G02F 1/133753 349/123 |
| 2013/0003008 | A1* | 1/2013 | Okumoto | G02F 1/133514 349/155 |

(Continued)

FOREIGN PATENT DOCUMENTS

KR 10-2005-0033293 A 4/2005
KR 10-2010-0034961 A 4/2010

*Primary Examiner* — Dennis Y Kim
(74) *Attorney, Agent, or Firm* — H.C. Park & Associates, PLC

(57) ABSTRACT

A liquid crystal display device includes a first substrate having a display area and a non-display area; a second substrate; a sealing unit between the first and second substrates; the sealing unit surrounding the display area; a liquid crystal layer interposed between the first and second substrates; the liquid crystal layer surrounded by the sealing unit; at least one containment barrier between the sealing unit and the display area. The containment barrier may have a tapering angle different from that of a pattern formed on the display area.

15 Claims, 7 Drawing Sheets

(56) References Cited

U.S. PATENT DOCUMENTS

| | | | |
|---|---|---|---|
| 2013/0057820 A1* | 3/2013 | Hyodo | G02F 1/1337 349/155 |
| 2014/0063431 A1* | 3/2014 | Shih | G02F 1/1339 349/153 |
| 2014/0320789 A1* | 10/2014 | Son | G02F 1/1337 349/123 |
| 2015/0055067 A1* | 2/2015 | Kuramoto | G02F 1/13394 349/106 |
| 2015/0192816 A1* | 7/2015 | Shih | G02F 1/1339 349/42 |
| 2016/0077376 A1* | 3/2016 | Lee | G02F 1/133512 349/106 |

* cited by examiner

LIQUID CRYSTAL DISPLAY DEVICE

CLAIM OF PRIORITY

This application claims the priority to and all the benefits accruing under 36 U.S.C. §119 of Korean Patent Application No. 10-2014-0145325, filed on Oct. 24, 2014, with the Korean Intellectual Property Office (KIPO), the disclosure of which is incorporated herein in its entirety by reference.

BACKGROUND OF THE INVENTION

1. Field of Disclosure

Embodiments of the present invention relate to a liquid crystal display device capable of preventing permeation of alignment solution outwards from a substrate.

2. Description of the Related Art

In recent information-oriented society, importance of displays as visual-information communication media has been increasingly emphasized and further development in low power consumption, thinness, light weight, and high definition is required so as to be prominent among a number of display devices.

Such display devices may be divided into two types a light emitting type capable of performing self-light emission, such as a cathode ray tube (CRT), an electro luminescence (EL), a light emitting diode (LED), a vacuum fluorescent display (VFD), a field emission display (FED), and a plasma display panel (PDP), and a non-light emitting type not capable of self-light emission, such as a liquid crystal display (LCD).

Among them, LCD devices may utilize optical anisotropy of liquid crystals to display images. The LCD devices have drawn attention as a display device of the next generation along with PDPs and FEDs, by virtue of its excellent visibility, low power consumption, and less heat generation compared to CRTs of the same size.

In general, LCD devices have a structure where a first substrate on which a thin film transistor (TFT) is provided and a second substrate on which a color filter is provided are bonded together with a liquid crystal layer interposed therebetween. Further, an alignment layer is formed on each uppermost layer of the first and second substrates and initial orientation of liquid crystals is determined by the alignment layers.

In order to form an alignment layer, liquid-type alignment solution is coated on a substrate and then plastic processing is performed thereto.

However, due to permeability of alignment solution, the alignment solution may permeate into a sealing-unit forming area on an outer circumferential portion of the substrate. When the alignment solution permeates into the sealing-unit forming area, an alignment layer may be also formed on the sealing-unit forming area after the plastic processing. In this case, at an overlapping portion of the alignment layer and the sealing unit, gap defects may occur by a height of the alignment layer. Further, as the sealing-unit forming area is contaminated with the alignment solution, adhesion of the sealing unit may be weakened. Accordingly, adhesion between the first and second substrates may deteriorate.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY OF THE INVENTION

Aspects of embodiments of the present invention are directed to a liquid crystal display device capable of preventing permeation of alignment solution into a sealing-unit forming area.

According to an exemplary embodiment, a liquid crystal display device includes a first substrate having a display area and a non-display area; a second substrate; a sealing unit between the first and second substrates; the sealing unit surrounding the display area; a liquid crystal layer interposed between the first and second substrates; the liquid crystal layer surrounded by the sealing unit; at least one containment barrier between the sealing unit and the display area. The containment barrier may have a tapering angle different from that of a pattern formed on the display area.

The containment barrier may have a tapering angle greater than that of the pattern.

The liquid crystal display device may further include a black matrix on one of the first and second substrates, the black matrix configured to define at least one pixel region; at least one color filter disposed corresponding to the pixel region; and at least one column spacer provided on one of the first and second substrates.

The pattern may be the color filter.

The containment barrier may include materials the same as that of one of the color filter and the column spacer.

The color filter may be provided on the first substrate.

The black matrix may be provided on the second substrate.

The containment barrier may overlap the black matrix.

The liquid crystal display device may further include a first alignment layer on the first substrate and a second alignment layer on the second substrate.

The containment barrier and the pattern may have a convex-concave form.

The containment barrier may have a tapering angle in a range of about 30 to 90 degrees and the pattern may have a tapering angle in a range of about 10 to 60 degrees.

The containment barrier may protrude from one of the first and second substrates and may form at least one closed loop.

The containment barrier may form at least one closed loop surrounding an area smaller than a size of the display area.

The closed loop may be at least one of a hexagon, a quadrangle, a trapezoid, a lozenge, and a triangle in shape.

According to an exemplary embodiment, a liquid crystal display device includes a first substrate comprising a display area and a non-display area; a second substrate; at least one column spacer provided on one of the first and second substrates; a sealing unit between the first and second substrates; the sealing unit surrounding the display area; a liquid crystal layer interposed between the first and second substrates; the liquid crystal layer surrounded by the sealing unit; and at least one containment barrier between the sealing unit and the at least one column spacer, wherein a cross sectional shape of the at least one containment barrier has at least two protrusions.

According to embodiments of the present invention, a liquid crystal display device may have the following effects.

A containment barrier according to an exemplary embodiment may be provided in a closed-loop shape. Thus, alignment solution can be contained within the containment barrier.

Further, the containment barrier according to an exemplary embodiment may have a tapering angle greater than patterns of a display area. Thus, alignment solution coated on a substrate may not easily flow over the containment barrier.

Accordingly, the alignment solution coated on the substrate may not permeate into a sealing-unit forming area. Therefore, contamination of the sealing-unit forming area may be prevented or efficiently reduced.

The foregoing is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
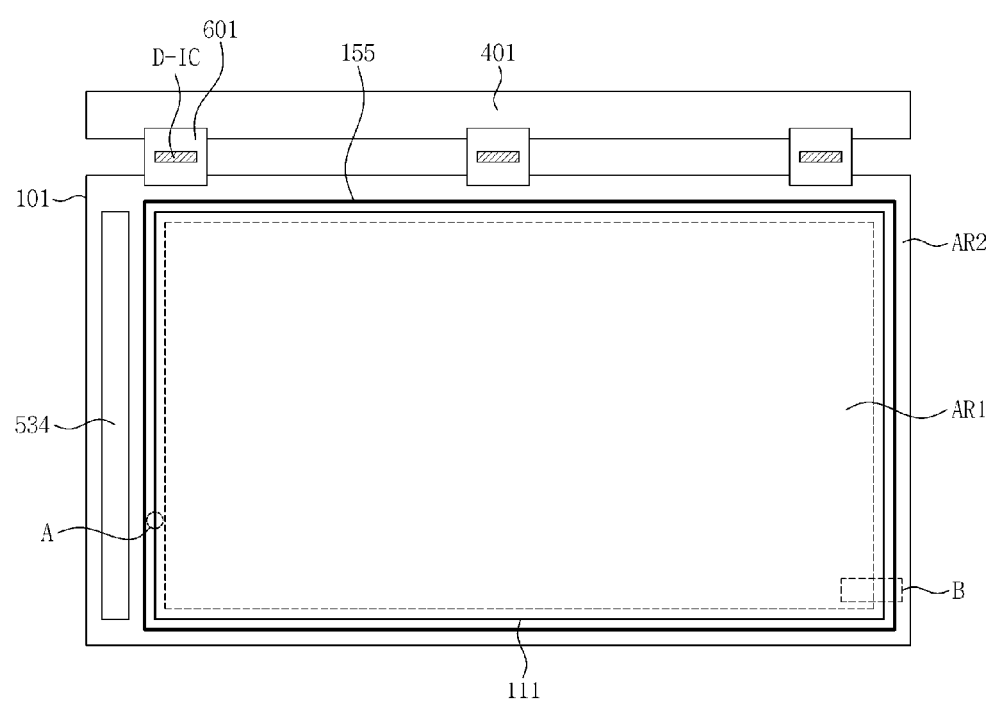
FIG. 1 is a view illustrating a first substrate of an LCD device according to an exemplary embodiment.

Advantages and features of the present invention and methods for achieving them will be made clear from embodiments described below in detail with reference to the accompanying drawings. The present invention may, however, be embodied in many different forms and should not be construed as being limited to the embodiments set forth herein. Rather, these embodiments are provided so that this disclosure will be thorough and complete, and will fully convey the scope of the invention to those skilled in the art. The present invention is merely defined by the scope of the claims. Therefore, well-known constituent elements, operations and techniques are not described in detail in the embodiments in order to prevent the present invention from being obscurely interpreted. Like reference numerals refer to like elements throughout the specification.

In the drawings, thicknesses are illustrated in an enlarged manner in order to clearly describe a plurality of layers and areas. Like reference numbers are used to denote like elements throughout the specification. When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The spatially relative terms "below", "beneath", "lower", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Figure 2:
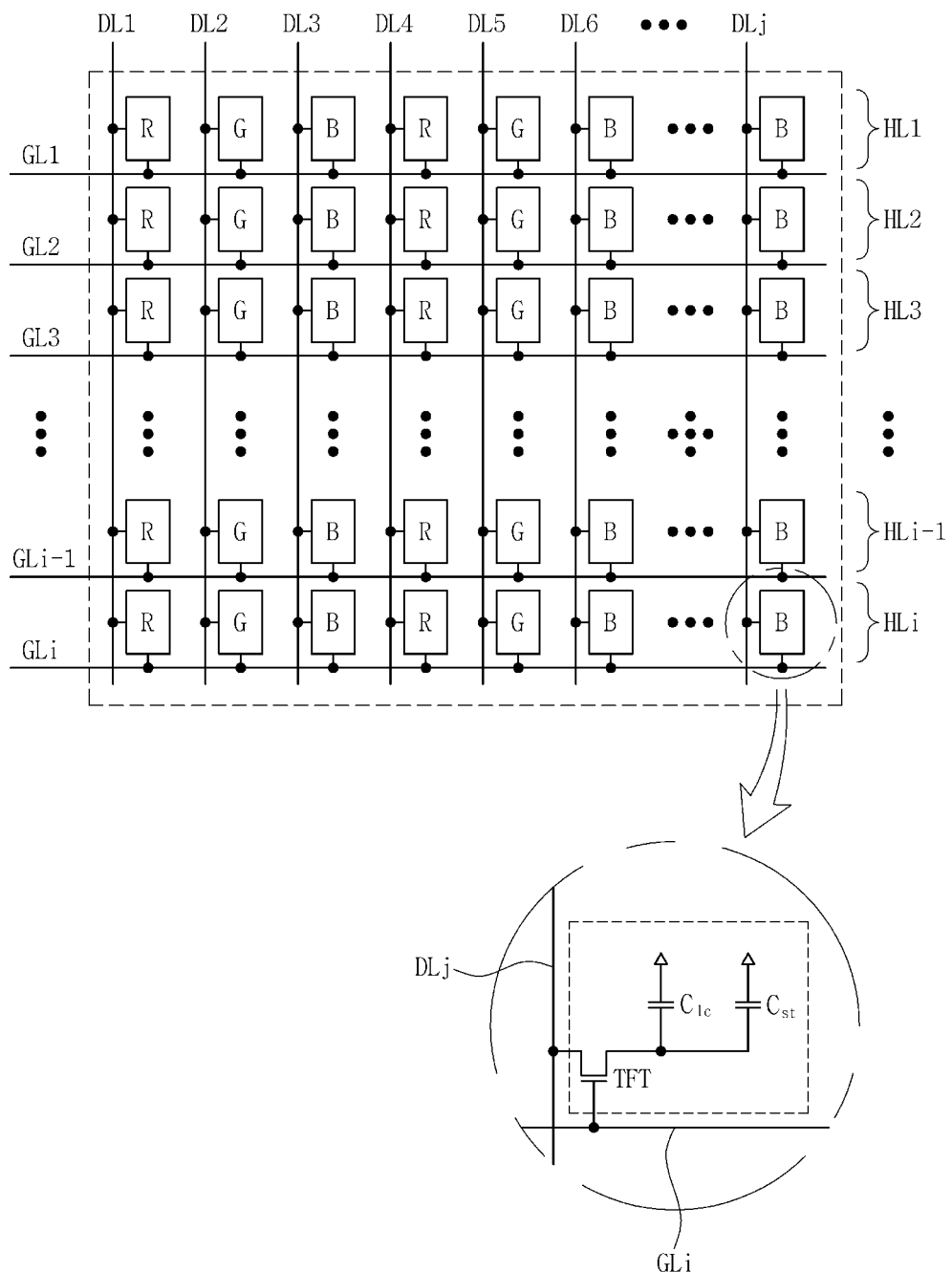
FIG. 2 is a view illustrating an arrangement of pixels on a display area of the first substrate illustrated in FIG. 1.

FIG. 1 is a view illustrating a first substrate of an LCD device according to an exemplary embodiment. FIG. 2 is a view illustrating an arrangement of pixels on a display area AR1 of the first substrate illustrated in FIG. 1.

The first substrate 101, as illustrated in FIG. 1, may be divided into the display area AR1 and a non-display area AR2. On the display area AR1, as illustrated in FIG. 2, a plurality of gate lines GL1 to GLi, a plurality of data lines DL1 to DLj intersecting the gate lines GL1 to GLi, and a plurality of pixels R, G, and B connected to the gate lines GL1 to GLi and the data lines DL1 to DLj are arranged.

Figure 5:
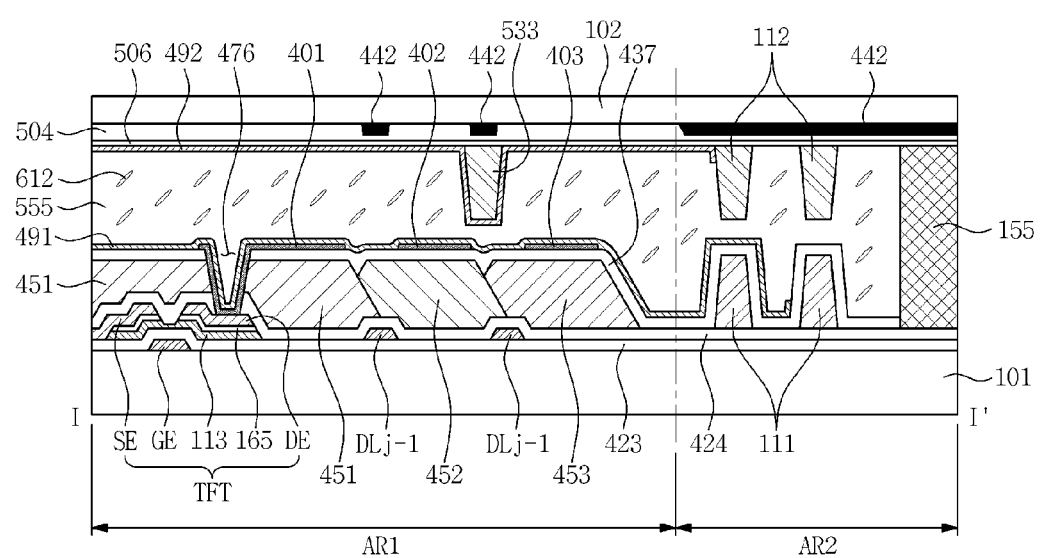
FIG. 5 is a cross-sectional view taken along line I-I' of FIG. 4.

Meanwhile, the display device according to an exemplary embodiment may further include a second substrate (102 of FIG. 5) and a liquid crystal layer (555 of FIG. 5). The second substrate 102 may be opposed to the first substrate 101 with the liquid crystal layer 555 interposed therebetween. The second substrate 102 may have a size that can at least cover an entire surface of the display area AR1 of the first substrate 101.

The first and second substrates 101 and 102 may be bonded to each other by a sealing unit 155. The sealing unit 155 may surround the display area AR1 and may be disposed between the first and second substrates 101 and 102. The liquid crystal layer 555 may be surrounded by the sealing unit 155.

A first containment barrier 111 may be provided between the sealing unit 155 and the display area AR1. The first containment barrier 111 may protrude from the first substrate 101 to have a predetermined height. The first containment barrier 111 may prevent permeation of a first alignment solution (686 in FIG. 6) (i.e., materials for a first alignment layer) coated on the display area AR1 of the first substrate 101 outwards from the display area AR1. As illustrated in FIG. 1, the first containment barrier 111 may be provided in a closed-loop shape surrounding the display area AR1. Meanwhile, the first containment barrier 111 may have an open-loop shape at least partially discontinuous.

In some embodiments, two or more first containment barriers may be provided between the sealing unit 155 and the display area AR1. For example, when two first containment barriers 111 are provided, one first containment barrier may be disposed between the sealing unit 155 and the display area AR1 and the other first containment barrier may be disposed between the first containment barrier and the sealing unit 155. In this case, as described above, each of the two first containment barriers may be provided in a closed-loop shape or in a discontinuous open-loop shape.

According to another exemplary embodiment, a first containment barrier 111 may form at least one closed loop surrounding an area smaller than the size of the display area AR1. The detailed description will follow with reference to FIG. 3.

Figure 3:
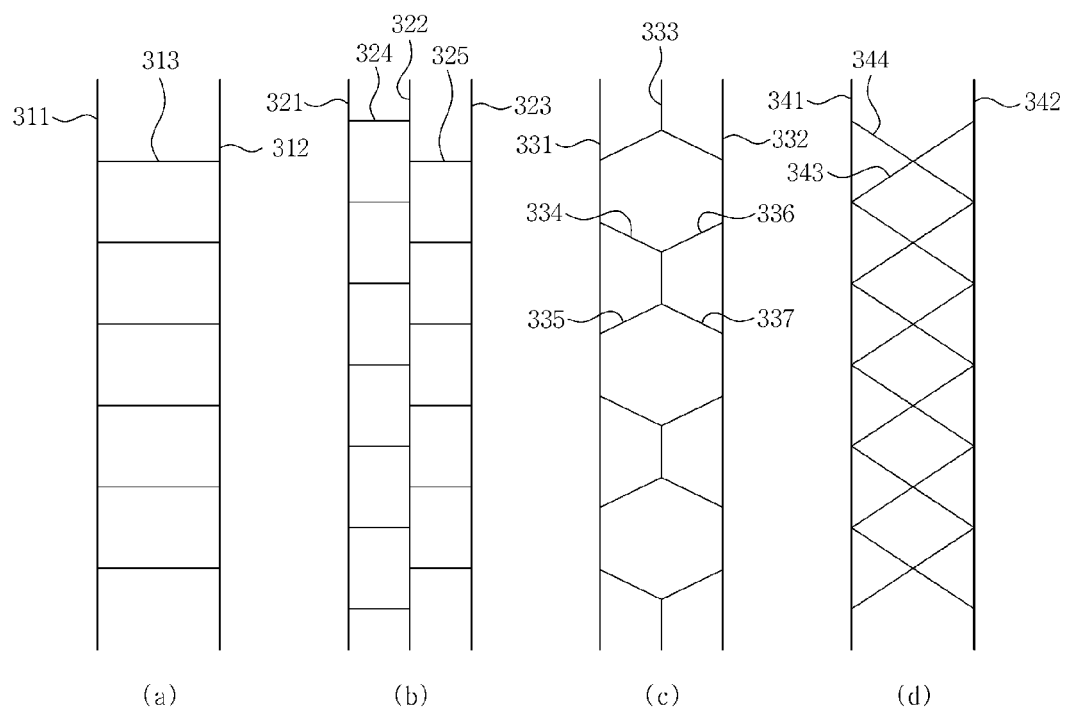
FIG. 3 is an enlarged view illustrating "A" portion of FIG. 1.

FIG. 3 is an enlarged view illustrating "A" portion of FIG. 1.

As illustrated in (a) of FIG. 3, a first containment barrier 111 may include a first protrusion 311, a second protrusion 312, and a third protrusion 313.

The first protrusion 311 may surround the display area AR1. The first protrusion 311 may be provided in a closed-loop shape or in a discontinuous open-loop shape.

The second protrusion 312 may surround the display area AR1 and the first protrusion 311. The second protrusion 312 may be provided in a closed-loop shape or in a discontinuous open-loop shape. Meanwhile, the first and second protrusions 311 and 312 may be disposed in parallel with each other.

The third protrusion 313 may be disposed between the first and second protrusions 311 and 312. In this case, both end portions of the third protrusion 313 may be respectively connected to the first protrusion 311 and the second protrusion 312. The third protrusion 313 may have a straight line shape.

Herein, a part of the first protrusion 311, a part of the second protrusion 312, and two of the third protrusions 313 disposed adjacent to each other may form a quadrangular closed loop. The part of the first protrusion 311 may correspond to a part connecting an end portion of each of the third protrusions 313 adjacent to each other. Further, the part of the second protrusion 312 may correspond to a part connecting another end portion of each of the third protrusions 313 adjacent to each other. Meanwhile, an area surrounded by the quadrangular closed loop may be smaller than the size of the display area AR1.

According to another exemplary embodiment, a first containment barrier 111, as illustrated in (b) of FIG. 3, may include a first protrusion 321, a second protrusion 322, a third protrusion 323, a fourth protrusion 324, and a fifth protrusion 325.

The first protrusion 321 may surround the display area AR1. The first protrusion 321 may be provided in a closed-loop shape or in a discontinuous open-loop shape.

The second protrusion 322 may surround the display area AR1 and the first protrusion 321. The second protrusion 322 may be provided in a closed-loop shape or in a discontinuous open-loop shape.

The third protrusion 323 may surround the display area AR1, the first protrusion 321, and the second protrusion 322. The third protrusion 323 may be provided in a closed-loop shape or in a discontinuous open-loop shape. Meanwhile, at least two of the first, second, and third protrusions 321, 322, and 323 may be disposed parallel to each other.

The fourth protrusion 324 may be disposed between the first protrusion 321 and the second protrusion 322. In this case, both end portions of the fourth protrusion 324 may be respectively connected to the first protrusion 321 and the second protrusion 322. The fourth protrusion 324 may have a straight line shape.

The fifth protrusion 325 may be disposed between the second protrusion 322 and the third protrusion 323. In this case, both end portions of the fifth protrusion 325 may be respectively connected to the second protrusion 322 and the third protrusion 323. The fifth protrusion 325 may have a straight line shape. Meanwhile, an imaginary line extending along a longitudinal direction of the fourth protrusion 324 may not intersect the fifth protrusion 325 and an imaginary line extending along a longitudinal direction of the fifth protrusion 325 may not intersect the fourth protrusion 324.

Herein, a part of the first protrusion 321, a part of the second protrusion 322, and two of the fourth protrusions 324 adjacent to each other may form a quadrangular closed loop. The part of the first protrusion 321 may correspond to a part connecting an end portion of each of the fourth protrusions 324 adjacent to each other. Further, the part of the second protrusion 322 may correspond to a part connecting another end portion of each of the fourth protrusions 324 adjacent to each other. Meanwhile, an area surrounded by the quadrangular closed loop may be smaller than the size of the display area AR1.

Further, a part of the second protrusion 322, a part of the third protrusion 323, and two of the fifth protrusions 325 disposed adjacent to each other may form a quadrangular closed loop. The part of the second protrusion 322 may correspond to a part connecting an end portion of each of the fifth protrusions 325 adjacent to each other. Further, the part of the third protrusion 323 may correspond to a part connecting another end portion of each of the fifth protrusions 325 adjacent to each other. Meanwhile, an area surrounded by the quadrangular closed loop may be smaller than the size of the display area AR1.

According to yet another exemplary embodiment, a first containment barrier 111, as illustrated in (c) of FIG. 3, may include a first protrusion 331, a second protrusion 332, a third protrusion 333, a fourth protrusion 334, a fifth protrusion 335, a sixth protrusion 336, and a seventh protrusion 337.

The first protrusion 331 may surround the display area AR1. The first protrusion 331 may be provided in a closed-loop shape or in a discontinuous open-loop shape.

The second protrusion 332 may surround the display area AR1 and the first protrusion 331. The second protrusion 332 may be provided in a closed-loop shape or in a discontinuous open-loop shape. Meanwhile, the first and second protrusions 331 and 332 may be disposed in parallel with each other.

The third protrusion 333 may be disposed between the first and second protrusions 331 and 332. The third protrusion 333 may have a length less than that of the first protrusion 331 (or the second protrusion 332). Meanwhile, at least two of the first, second, and third protrusions 331, 332, and 333 may be disposed parallel to each other.

The fourth protrusion 334 may connect an end portion of the third protrusion 333 and a part of the first protrusion 331. The fourth protrusion 334 may diagonally extend with respect to the third protrusion 333.

The fifth protrusion 335 may connect another end portion of the third protrusion 333 and another part of the first protrusion 331. The fifth protrusion 335 may diagonally extend with respect to the third protrusion 333. In this case, the fourth and fifth protrusions 334 and 335 may extend in a direction gradually getting farther away from each other with respect to the third protrusion 333.

The sixth protrusion 336 may connect an end portion of the third protrusion 333 and a part of the second protrusion 332. The sixth protrusion 336 may diagonally extend with respect to the third protrusion 333. Meanwhile, the sixth protrusion 336 and the fifth protrusion 335 may be disposed in parallel with each other.

The seventh protrusion 337 may connect another end portion of the third protrusion 333 and another part of the second protrusion 332. The seventh protrusion 337 may diagonally extend with respect to the third protrusion 333. In this case, the seventh protrusion 337 and the sixth protrusion 336 may extend in a direction gradually getting farther away from each other with respect to the third protrusion 333. Meanwhile, the seventh protrusion 337 and the fourth protrusion 334 may be disposed in parallel with each other.

Herein, a part of the first protrusion 331, a part of the second protrusion 332, and the fourth, fifth, sixth, and seventh protrusions 334, 335, 336, and 337 disposed between two of the third protrusions 333 adjacent to each other may form a hexagonal closed loop. The part of the first protrusion 331 may correspond to a part connecting the fourth and fifth protrusions 334 and 335. Further, the part of the second protrusion 332 may correspond to a part connecting the sixth and seventh protrusions 336 and 337. Meanwhile, an area surrounded by the hexagonal closed loop may be smaller than the size of the display area AR1.

Further, a part of the first protrusion 331 and the third, fourth and fifth protrusions 333, 334 and 335 connected to each other may form a trapezoidal closed loop. The part of the first protrusion 331 may correspond to a part connecting the fourth and fifth protrusions 334 and 335. Meanwhile, an area surrounded by the trapezoidal closed loop may be smaller than the size of the display area AR1.

Further, a part of the second protrusion 332 and the third, sixth, and seventh protrusions 333, 336, and 337 connected to each other may form a trapezoidal closed loop. The part of the second protrusion 332 may correspond to a part connecting the sixth and seventh protrusions 336 and 337. Meanwhile, an area surrounded by the trapezoidal closed loop may be smaller than the size of the display area AR1.

According to yet another exemplary embodiment, a first containment barrier 111, as illustrated in (d) of FIG. 3, may include a first protrusion 341, a second protrusion 342, a third protrusion 343, and a fourth protrusion 344.

The first protrusion 341 may surround the display area AR1. The first protrusion 341 may be provided in a closed-loop shape or in a discontinuous open-loop shape.

The second protrusion 342 may surround the display area AR1 and the first protrusion 341. The second protrusion 342 may be provided in a closed-loop shape or in a discontinuous open-loop shape.

The third protrusion 343 may be disposed between the first and second protrusions 341 and 342. The third protrusion 343 may diagonally extend with respect to the first protrusion 341 (or with respect to the second protrusion 342). In this case, both end portions of the third protrusion 343 may be respectively connected to the first and second protrusions 341 and 342.

The fourth protrusion 344 may be disposed between the first and second protrusions 341 and 342. The fourth protrusion 344 may intersect the third protrusion 343 and may diagonally extend with respect to the first protrusion 341 (or with respect to the second protrusion 342). In this case, both end portions of the fourth protrusion 344 may be respectively connected to the first and second protrusions 341 and 342.

Herein, when an intersection of a third protrusion 343 and a fourth protrusion 343 intersecting each other is defined as a first intersection, an intersection of the third protrusion 343 and a first protrusions 341 intersecting each other is defined as a second intersection, and an intersection of the fourth protrusion 344 and the first protrusion 341 intersecting each other is defined as a third intersection, a part of the third protrusion 343 between the first and second intersections, a part of the fourth protrusion 344 between the first and third intersections, and a part of the first protrusion 341 between the third and second intersections may form a triangular closed loop. Meanwhile, an area surrounded by the triangular closed loop may be smaller than the size of the display area AR1.

Further, in a case where an intersection of a third protrusion 343 and a fourth protrusion 344 intersecting each other is defined as a first intersection, an intersection of the fourth protrusion 344 and a second protrusion 342 intersecting each other is defined as a second intersection, and an intersection of the third protrusion 343 and the second protrusion 342 intersecting each other is defined as a third intersection, a part of the fourth protrusion 344 between the first and second intersections, a part of the third protrusion 343 between the first and second intersections, and a part of the second protrusion 342 between the third and second intersections may form a triangular closed loop. Meanwhile, an area surrounded by the triangular closed loop may be smaller than the size of the display area AR1.

Further, in a case where an intersection of a pair of third and fourth protrusions 343 and 344 intersecting each other is defined as a first intersection, an intersection of another pair of a third protrusion (hereinafter, thirty-third protrusion) and a fourth protrusion (hereinafter, forty-fourth protrusion) intersecting each other and disposed adjacent to the pair of third and fourth protrusions 343 and 344 is defined as a second intersection, and an intersection of the third protrusion 343, the forty-fourth protrusion and a first protrusion 341 is defined as a third intersection, and an intersection of the fourth protrusion 344, the thirty-third protrusion, and a second protrusion 342 is defined as a fourth intersection, a part of the third protrusion 343 between the first and third intersections, a part of the forty-fourth protrusion between the third and second intersections, a part of the thirty-third protrusion between the second and fourth intersections, and a part of the fourth protrusion 344 between the fourth and first intersections may form a closed loop in a lozenge shape. Meanwhile, an area surrounded by the lozenge-shaped closed loop may be smaller than the size of the display area AR1.

Pixels R, G, and B may be arranged in a matrix form in the display area AR1. The pixels R, G, and B may be categorized into red pixels R configured to display a red image, green pixels G configured to display a green image, and blue pixels B configured to display a blue image. In this case, red, green, and blue pixels R, G, and B adjacently disposed in a horizontal direction may form a unit pixel to display a unit image.

J pixels arranged along an nth (n is a number selected from 1 to i) horizontal line (hereinafter, nth horizontal line pixels) may be respectively connected to the first to the jth data lines DL1 to DLj. Further, the nth horizontal line pixels may be connected to the nth gate line together. Accordingly, the nth horizontal line pixels may receive an nth gate signal together. That is, j pixels arranged in the same horizontal line may receive the same gate signal, while pixels arranged in different horizontal lines may receive different gate signals. For example, both red and green pixels R and G disposed on the first horizontal line HL1 may receive a first gate signal, while red and green pixels R and G disposed on the second horizontal line HL2 may receive a second gate signal that has a different timing compared to the first gate signal.

Each of the pixels R, G, and B, as illustrated in FIG. 2, may include a TFT, a liquid crystal capacitor CLC, a storage capacitor Cst, and a color filter (not illustrated).

The TFT may be turned on according to a gate signal applied from the gate line. The turned-on TFT may supply an analog image data signal applied from the data line to the liquid crystal capacitor CLC and the storage capacitor Cst.

The liquid crystal capacitor CLC may include a pixel electrode and a common electrode opposed to each other.

The storage capacitor Cst may include a pixel electrode and an opposing electrode opposed to each other. Herein, the opposing electrode may be a previous gate line or a common line that may transmit a common voltage.

A gate driver 534 may be disposed on the non-display area AR2. For example, as illustrated in FIG. 1, the gate driver 534 may be disposed on an area of the non-display area AR2, adjacent to a left edge portion of the display area AR1.

The gate driver 534 is configured to produce gate signals according to a gate control signal applied from a timing controller and sequentially apply the gate signals to the plurality of gate lines. The gate driver 534, for example, may include a shift register configured to shift a gate start pulse according to a gate shift clock to thereby produce gate signals. The shift register may include a plurality of switching elements. The switching elements may be formed on the first substrate 101 in the same process as in the TFT of the display area AR1.

A data driving integrated circuit D-IC is configured to receive digital image data signals and data control signals from the timing controller. The data driving integrated circuit D-IC may perform sampling of the digital image data signals according to the data control signal, perform latching of the sampled image data signals corresponding to one horizontal line each horizontal period, and apply the latched image data signals to the data lines DL1 to DLj. That is, the data driving integrated circuit D-IC may convert the digital image data signals applied from the timing controller into analog image signals using gamma voltages inputted from a power supplier (not illustrated) and may provide them to the data lines DL1 to DLj.

The data driving integrated circuit D-IC, as illustrated in FIG. 1, may be mounted on each carrier 601.

The carrier 601 may be manufactured into a tape or film form.

The carrier 601 may electrically connect a source printed circuit board (PCB) 401 and the first substrate 101. To this end, each carrier 601 may include a plurality of pad electrodes. The pad electrodes may be divided into a plurality of input terminals and a plurality of output terminals. Herein, the input terminals of the carrier 601 may be connected to output source signal lines (not illustrated) of the source PCB 401, while the output terminals of the carrier 601 may be connected to a pad unit (not illustrated) provided in the non-display area AR2 of the first substrate 101.

The pad unit may be connected to the data lines DL1 to DLj through link lines. The pad unit may be disposed on an area of the non-display area AR2, adjacent to an upper edge portion of the display area AR1.

One side of the carrier 601 on which the input terminals are disposed and the source PCB 401 may be bonded to each other by an anisotropic conductive bonding film. Further, another side of the carrier 601 on which the output terminals are disposed and the first substrate 101 may be bonded to each other by an anisotropic conductive bonding film The carrier 601 may include a flexible material that can be bent. For example, the carrier 601 may be formed of polyimide that has a high coefficient of thermal expansion (CTE) and excellent durability. Other than that, a synthetic resin, such as acrylic, polyether nitrile, polyethersulfone, polyethylene terephthalate, and polyethylenenaphthalate, may be used to form the carrier 601.

A part of the output source signal lines may transmit image data signals and a data control signal applied from the timing controller to the data driving integrated circuit D-IC mounted on the carrier 601. In this case, the data driving integrated circuit D-IC may receive image data signals and a data control signal through input line patterns (not illustrated) provided on the carrier 601. Then, the data driving integrated circuit D-IC may output analog image data signals through output line patterns provided on the carrier 601. Herein, an end portion of each input line pattern may correspond to the above-described input terminal and an end portion of each output line pattern may correspond to the above-described output terminal.

Another part of the output source signal lines may transmit a gate control signal to the gate driver 534, through auxiliary line patterns provided on one of the carriers and auxiliary lines provided on a corner portion of the first substrate 101. The auxiliary line patterns may be provided on an outermost carrier 601 of the entire carrier tapes. For example, as illustrated in FIG. 1, the auxiliary line patterns may be provided on a leftmost carrier 601.

Figure 4:
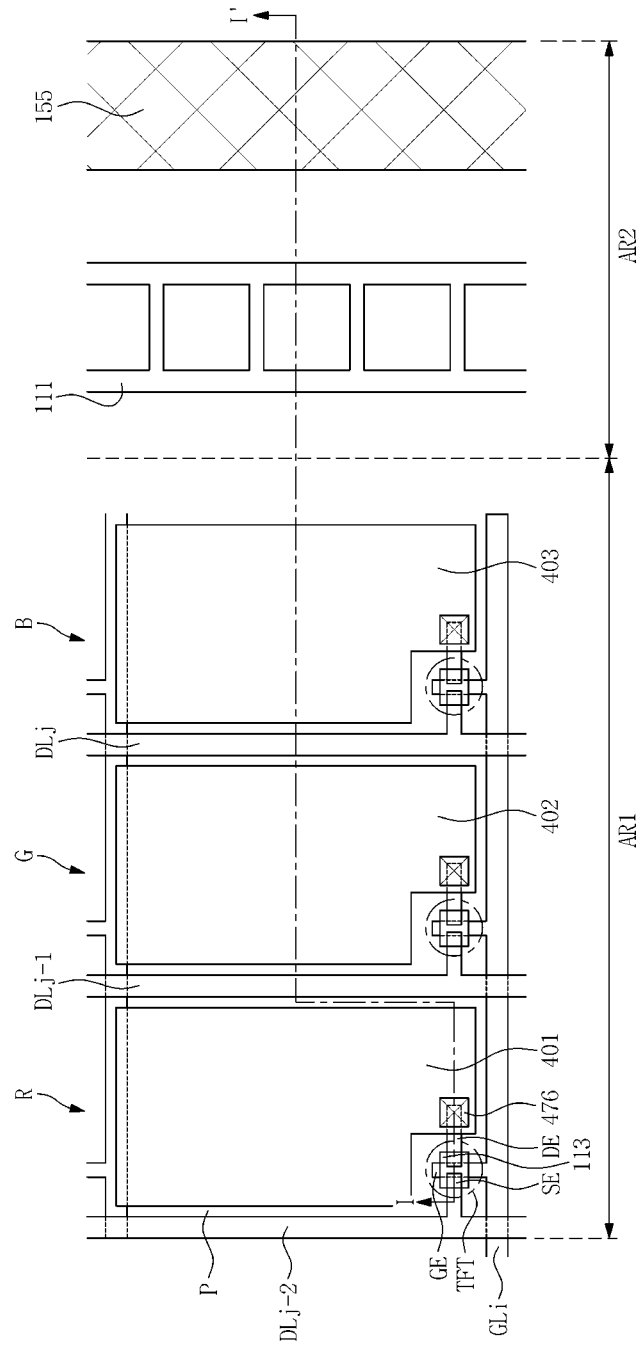
FIG. 4 is an enlarged view illustrating "B" portion of FIG. 1.

FIG. 4 is an enlarged view illustrating "B" portion of FIG. 1, and FIG. 5 is a cross-sectional view taken along line I-I' of FIG. 4. In particular, FIG. 5 also illustrates cross-sections of a second substrate 102 and components provided thereon.

As illustrated in FIG. 4, "B" portion illustrates red, green, and blue pixels R, G, and B connected to a gate line together.

First, the first substrate 101 and components provided thereon will be described below.

The first substrate 101 may be an insulating substrate including transparent materials, such as glass and plastic.

A gate line GL and a gate electrode may be disposed on the first substrate 101. Although not illustrated, a connecting portion (e.g., an end portion) of the gate line GL may be larger than other portions thereof in size, so as to be properly connected to another layer or external driving circuits. The gate line GL may include at least one metal of aluminum (Al) or alloys thereof, silver (Ag) or alloys thereof, copper (Cu) or alloys thereof, molybdenum (Mo) or alloys thereof, chromium (Cr), tantalum (Ta) and titanium (Ti), but is not limited thereto. In some embodiments, the gate line GL may have a multi-layer structure including at least two conductive layers that have different physical properties.

The gate electrode GE branches out or extends from the gate line GL. As illustrated in FIG. 2, the gate electrode GE may protrude toward the pixel region P. The gate electrode GE may be made of the same material and have the same structure (a multi-layer structure) as in the gate line GL. In other words, the gate electrode GE and the gate line GL may be simultaneously formed in the same process.

A gate insulating layer 423 may be disposed on the gate line GL and the gate electrode GE. In this case, the gate insulating layer 423 may be formed over the entire surface of the first substrate 101 including the gate line GL and the gate electrode GE. The gate insulating layer 423 may be made of, for example, silicon nitrides (SiNx), silicon oxides (SiOx), and the like. The gate insulating layer 423 may have a multi-layer structure including at least two insulating layers that have physical properties different from each other.

A semiconductor layer 113 may be disposed on the gate insulating layer 423. In this case, the semiconductor layer 113 may at least partially overlap the gate electrode GE. The semiconductor layer 113 may be made of amorphous silicon, polycrystalline silicon, and the like.

An ohmic contact layer 165 may be disposed on the semiconductor layer 113. The ohmic contact layer 165 may include n+ hydrogenated amorphous silicon highly doped with n-type impurities, such as phosphorus, or silicide. The ohmic contact layer 165 may be disposed on the semiconductor layer 113 in pairs.

Source and drain electrodes SE and DE may be disposed on the ohmic contact layer 165.

The source electrode SE may branch out or extend from the j-2th data line DLj-2 and may protrude toward the gate electrode GE. The source electrode SE may at least partially overlap the semiconductor layer 113 and the gate electrode GE. The source electrode SE may have an inverted C-form surrounding a part of the drain electrode DE. Meanwhile, the source electrode SE may have one of a C-form, a U-form, and an inverted U-form, rather than the inverted C-form.

In some applications, it is desirable that the source electrode SE is made of refractory metal, such as molybdenum, chromium, tantalum and titanium, or a metal alloy thereof, and may have a multi-layer structure including a refractory metal layer and a low-resistance conductive layer. Examples of the multi-layer structure may include a double-layer structure including a chromium or molybdenum (alloy) lower film and an aluminum (alloy) upper film; and a triple-layer structure including a molybdenum (alloy) lower film, an aluminum (alloy) intermediate film, and a molybdenum (alloy) upper film. Further, the source electrode SE may be formed of various metals or conductive materials rather than the above-described materials.

One side of the drain electrode DE may be connected to the pixel electrode 401. The other side of the drain electrode DE may at least partially overlap the semiconductor layer 113 and the gate electrode GE. The drain electrode DE may also include the same material and have the same structure (a multi-layer structure) as in the source electrode SE. In other words, the drain electrode DE and the source electrode SE may be simultaneously formed in the same process.

The gate, source, and drain electrodes GE, SE, and DE may together form a TFT TFT1 along with the semiconductor layer 113. In this case, a channel of the TFT TFT1 may be partially formed on the semiconductor layer 113 between the source and drain electrodes SE and DE.

The j-2th data line DLj-2, the j-1th data line DLj-1m and the jth data line DLj may be disposed on the gate insulating layer 423. Although not illustrated, each of the data lines DLj-2, DLj-1, and DLj may have a connecting portion (e.g., an end portion) that is larger than other portions thereof in size, so as to be properly connected to another layer or external driving circuits.

Each of the data lines DLj-2, DLj-1, and DLj may be configured to transmit a data signal and may extend in its longitudinal direction to intersect the gate line GL. In this case, a center portion of each of the data lines DLj-2, DLj-1, and DLj may be bent into a V-shape, so that the LCD device can achieve a greater transmittance. Each of the data lines DLj-2, DLj-1, and DLj may include the same material and have the same structure (a multi-layer structure) as in the source electrode SE. In other words, each of the data lines DLj-2, DLj-1, and DLj and the source electrode SE may be simultaneously formed in the same process.

A first protection layer 424 may be disposed on the data line DL, the source electrode SE, and the drain electrode DE. In this case, the first protection layer 424 may be formed over the entire surface of the first substrate 101 including the data line DL, the source electrode SE, and the drain electrode DE. The first protection layer 424 may be formed of, for example, inorganic insulating materials such as silicon nitrides (SiNx) and silicon oxides (SiOx). When the first protection layer 424 is made of an inorganic insulating material, an inorganic material having photosensitivity and a dielectric constant of about 4.0 may be used. The first protection layer 424 may also have a double-layer structure including a lower inorganic layer and an upper organic layer, which has been found to impart desirable insulating properties and also to prevent damage to exposed portions of the semiconductor layer 113. As examples, the first protection layer 424 may have a thickness of about 5000 Å or more and may be about 6000 Å to about 8000 Å.

A red color filter 451, a green color filter 452, a blue color filter 453, and the first containment barrier 111 may be disposed on the first protection layer 424. In this case, the red color filter 451, the green color filter 452, and the blue color filter 453 may be disposed on each corresponding pixel region assigned to the display area AR1 and the first containment barrier 111 may be disposed on the non-display area AR2. Meanwhile, edge portions of each of the respective color filters 451, 452, and 453 may overlap edge portions of another color filter adjacent thereto. For example, as illustrated in FIG. 5, an edge portion of the green color filter 452 may overlap an edge portion of the red color filter 451.

The first containment barrier 111 may be manufactured along with one of the red, green, and blue color filters 451, 452, and 453. To this end, the first containment barrier 111 may include materials the same as that of the red, green, and blue color filters 451, 452, and 453. For example, the first containment barrier 111 may include photosensitivity organic materials.

The first containment barrier 111 may have a height substantially the same as that of one of the red, green, and blue color filters 451, 452, and 453. However, the first containment barrier 111 may have a height greater than that of the red, green, and blue color filters 451, 452, and 453. For example, through diffraction exposure using a half-tone mask, the first containment barrier 111 and the color filters 451, 452, and 453, each having a height different from each other, can be manufactured from a single layer.

A second protection layer 437 may be disposed on the red, green, and blue color filters 451, 452, and 453, and the first containment barrier 111. In this case, the second protection layer 437 may be formed over the entire surface of the first substrate 101 including the red, green, and blue color filters 451, 452, and 453 and the first containment barrier 111. The second protection layer 437 may include materials used to form the above-described first protection layer 424.

Pixel electrodes 401, 402, and 403 may generate an electric field along with a common electrode 130. The pixel electrodes 401, 402, and 403 may be disposed on the second protection layer 437. In this case, each of the pixel electrodes 401, 402, and 403 may be disposed on the corresponding pixel region. In detail, the pixel electrode 401 of the red pixel R may be disposed on the red color filter 451, the pixel electrode 402 of the green pixel G on the green color filter 452, and the pixel electrode 403 of the blue pixel B on the blue color filter 453.

The pixel electrode 401 of the red pixel R may be connected to the drain electrode DE exposed through a contact hole 476 extending through the second protection layer 437, the red color filter 451, and the first protection layer 424 together. The pixel electrode 402 of the green pixel G may be connected to another drain electrode exposed through another contact hole extending through the second protection layer 437, the green color filter 452, and the first protection layer 424 together. Further, the pixel electrode 403 of the blue pixel B may be connected to yet another drain electrode exposed through yet another contact hole extending through the second protection layer 437, the blue color filter 453, and the first protection layer 424 together.

Each of the pixel electrodes 401, 402, and 403 may include transparent conductive materials such as indium tin oxide (ITO) or indium zinc oxide (IZO). In this case, ITO may be a monomer or polymer material, and ITO may be a monomer or polymer material as well.

A first alignment layer 491 may be disposed on the second protection layer 437 and the pixel electrodes 401, 402, and 403. In this case, the first alignment layer 491 may be formed over the entire surface of the display area AR1 including the second protection layer 437 and the pixel electrodes 401, 402, and 403.

Hereinafter, the second substrate 102 and components provided thereon will be described below.

The second substrate 102 may be an insulating substrate including transparent materials, such as glass and plastics.

A black matrix 442 may be disposed on the second substrate 102. The black matrix 442 is configured to block light leakage from an area, except for the pixel region P. The area except for the pixel region P may further include a disclination area where liquid crystal molecules may not be controlled due to an abnormal horizontal electric field.

An over coat layer 504 may be disposed on the black matrix 442. In this case, the over coat layer 504 may be formed on the entire surface of the second substrate 102 including the black matrix 442. The over coat layer 504 may provide a planarization surface. The over coat layer 504 may include inorganic insulating materials or organic insulating materials. Meanwhile, the overcoat layer 504 may be omitted.

A common electrode 506 may be disposed on the over coat layer 504. In this case, the common electrode 506 may be disposed on the entire surface of the second substrate including the over coat layer 504. The common electrode 506 may include transparent conductive materials such as indium tin oxide (ITO) or indium zinc oxide (IZO). The common electrode 506 may apply an electric field to the liquid crystal layer 555 along with the pixel electrode of the first substrate 101.

A column spacer 533 and a second containment barrier 112 may be disposed on the common electrode 506. In this case, the column spacer 533 may be disposed on the black matrix 442 on the display area AR1 and the second containment barrier 112 may be disposed on the black matrix 442 on the non-display area AR2. The column spacer 533 may maintain a cell gap between the first substrate 101 and the second substrate 102. The column spacer 533 may include organic materials or inorganic materials. The column spacer 533 may be provided in plural.

The second containment barrier 112 may be the same as the first containment barrier 111 in shape. In other words, the second containment barrier 112 may be provided between the sealing unit 155 and the display area AR1. The second containment barrier 112 may protrude from the second substrate 102 to have a predetermined height. The second containment barrier 112 may prevent permeation of a second alignment solution (materials of a second alignment layer 492) coated on the display area AR1 of the second substrate 102 outwards from the display area AR1. The second containment barrier 112 may be provided in a closed-loop shape surrounding the display area AR1. Meanwhile, the second containment barrier 112 may have an open-loop shape at least partially discontinuous.

Meanwhile, two or more of the second containment barriers may be provided between the sealing unit 155 and the display area AR1. For example, when two second containment barriers are provided, one of the second containment barriers is disposed between the sealing unit 155 and the display area AR1 and the other one of the second containment barriers is disposed between the second containment barriers and the sealing unit 155. In this case, both of the two second containment barriers may be provided in a closed-loop shape or a discontinuous open-loop shape.

According to another exemplary embodiment, the second containment barrier 1112 may form at least one closed loop surrounding an area smaller than the area of the display area AR1. In other words, the second containment barrier 112 may have one of the four structures illustrated in FIG. 3. The detailed description of the second containment barrier 112 makes reference to FIG. 3 and the related description.

Meanwhile, the second containment barrier 112 may be manufactured along with the column spacer 533. To this end, the second containment barrier 112 may include the same materials used to form the column spacer 533. For example, the second containment barrier 112 may include organic materials or inorganic materials.

The second containment barrier 112 may have substantially the same height as the column spacer 533. However, the second containment barrier 112 may have a height greater than the column spacer 533. For example, through diffraction exposure using a half-tone mask, the second containment barrier 112 and the column spacer 533 having different heights can be formed from a single layer.

The liquid crystal layer 555 may include a nematic liquid crystal material having a positive dielectric anisotropy. In the liquid crystal layer 555, a major axis of the liquid crystal molecules 612 may be aligned in parallel with one of the first and second substrates 101 and 102. Further, the liquid crystal molecules may be twisted 90 degrees from a rubbing direction of the first alignment layer 491 to the second alignment layer 492. In addition, the liquid crystal layer 555 may include a vertically aligned liquid crystal material rather than the nematic liquid crystal material.

Figure 6:
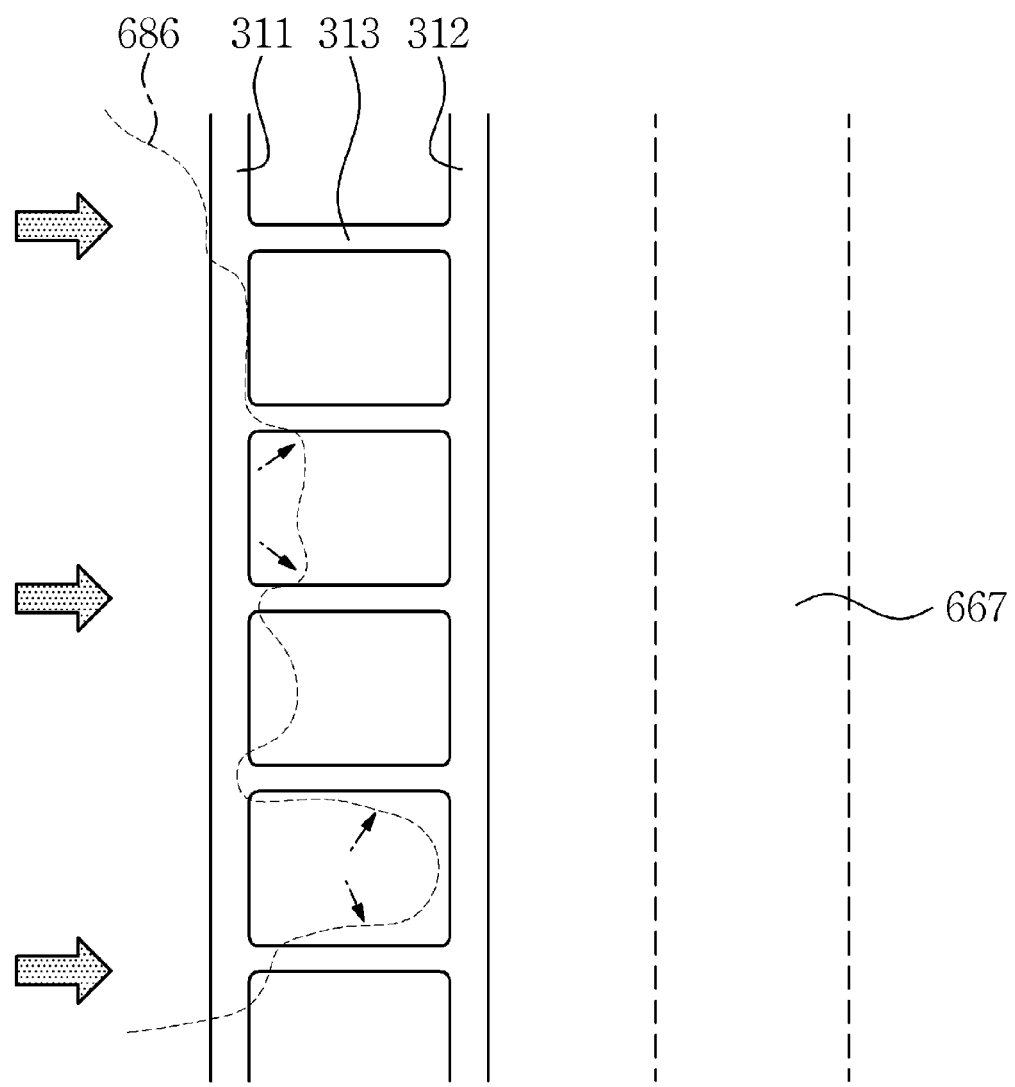
FIG. 6 is a view illustrating blocking of first-alignment-solution flow by a first containment barrier.

FIG. 6 is a view illustrating blocking of first-alignment-solution flow by the first containment barrier.

Arrows of FIG. 6 illustrate a flow direction of the first alignment solution 686. Flow of the first alignment solution 686, as illustrated in FIG. 6, may be blocked by the first containment barrier 111. In other words, due to the first containment barrier 111, the first alignment solution 686 may not permeate into an area on which the sealing unit 155 is to be formed (hereinafter, sealing-unit forming area 667). Meanwhile, although permeating through the first protrusion 311, the first alignment solution 686 may be contained within the first containment barrier 111 having a closed-loop shape. In other words, the first alignment solution 686 may flow into an area surrounded by the first protrusion 311, the second protrusion 312, and the adjacent third protrusion 313. Accordingly, the sealing-unit forming area 667 of the first substrate 101 may not be contaminated.

The second containment barrier 112 may block flow of the second alignment solution as in the first containment barrier 111. Accordingly, the sealing-unit forming area 667 of the second substrate 102 may not be contaminated.

Meanwhile, the first containment barrier 111 may have a different tapering angle compared to the pattern provided in the display area AR1. For example, the first containment barrier 111 may have a tapering angle greater than that of the pattern of the display area AR1. Herein, the pattern of the display area AR1 may be one of a gate line, a data line, a semiconductor layer, a pixel electrode, and a color filter. The detailed description will follow with reference to FIG. 7.

Figure 7A:
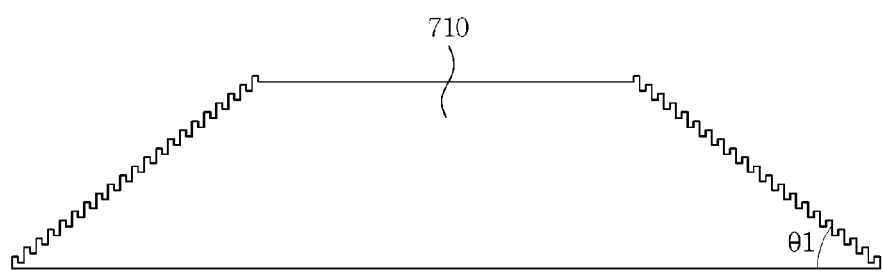
FIGS. 7a and 7b are cross-sectional views illustrating a color filter and the first containment barrier respectively.
Figure 7B:
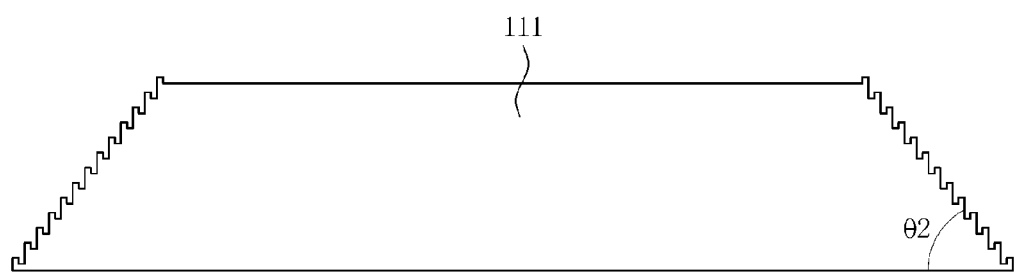

FIGS. 7a and 7b are cross-sectional views illustrating a color filter and the first containment barrier respectively.

The pattern formed on the display area AR1, as illustrated in FIG. 7a, may be a color filter 710. The color filter 710 may be at least one of the red color filter 451, the green color filter 452, and the blue color filter 453. The color filter 710 may have a tapering angle of a gentle angle θ1. However, as illustrated in FIG. 7b, the first containment barrier 111 in the non-display area AR2 may have a tapering angle of a sharp angle. For example, the color filter 710 may have a tapering angle of about 10 to 60 degrees.

Meanwhile, the first containment barrier 111 may have a tapering angle of θ2, which is sharper than that of the color filter 710. In this case, the first containment barrier 111 may have a tapering angle of about 30 to 90 degrees, under the condition that the tapering angle of the first containment barrier 111 is greater than the tapering angle of the color filter 710 selected from 10 to 60 degrees. For example, when the color filter 710 has a tapering angle of 60 degrees, the first containment barrier 111 may have a tapering angle of more than 60 degrees and about 90 degrees or less.

As such, it is advantageous that the patterns of the display area AR1 have gentle tapering angles so as to achieve excellent step coverage. However, it is advantageous that the first containment barrier 111 has a sharp tapering angle so as to efficiently block flow of the alignment solution.

A method of digital exposure may be employed in order to form the color filter 710 and the first containment barrier 111 having tapering angles different from each other, from the same material. In other words, through the digital exposure, the color filter 710 and the first containment barrier 111 may be formed from a single layer to have different tapering angles. For example, when a lens aligned on the color filter 710, among lenses provided in the digital exposure device, is out of focus, patterns having different tapering angles may be formed as described above. The lens aligned on the first containment barrier 111 may have a clear focus. In this case, due to the digital exposure, a concave-convex pattern may appear on surfaces of the color filter 710 and the first containment barrier 111.

Meanwhile, although not illustrated, the second containment barrier 112 may have a greater tapering angle than the column spacer 533 of the display area AR1. The second containment barrier 112 and the column spacer 533 may be formed by digital exposure. Further, the column spacer 533 may have a tapering angle in a range of about 10 to 60 degrees. Further, the second containment barrier 112 may have a tapering angle of about 30 to 90 degrees, under the condition that the tapering angle of the second containment barrier 112 is greater than the tapering angle of the column spacer 533 selected from 10 to 60 degrees.

From the foregoing, it will be appreciated that various embodiments in accordance with the present disclosure have been described herein for purposes of illustration, and that various modifications may be made without departing from the scope and spirit of the present teachings. Accordingly, the various embodiments disclosed herein are not intended to be limiting of the true scope and spirit of the present teachings. Various features of the above described and other embodiments can be mixed and matched in any manner, to produce further embodiments consistent with the invention.

What is claimed is:

1. A liquid crystal display device comprising:
    a first substrate comprising a display area and a non-display area surrounding the display area;
    a second substrate;
    a sealing unit between the first and second substrates, the sealing unit surrounding the non-display area;
    a liquid crystal layer interposed between the first and second substrates, the liquid crystal layer surrounded by the sealing unit;
    at least one column spacer provided on one of the first and second substrates;
    a black matrix on one of the first and second substrates, the black matrix configured to define at least one pixel region;
    at least one color filter disposed corresponding to the at least one pixel region; and
    at least one containment barrier in the non-display area between the sealing unit and the display area,
    wherein the at least one containment barrier has a tapering angle greater than that of a pattern disposed on the display area,
    wherein the pattern is the at least one color filter.

2. The liquid crystal display device of claim 1, wherein the at least one containment barrier comprises materials the same as that of one of the at least one color filter and the at least one column spacer.

3. The liquid crystal display device of claim 1, wherein the at least one color filter is provided on the first substrate.

4. The liquid crystal display device of claim 1, wherein the black matrix is provided on the second substrate.

5. The liquid crystal display device of claim 4, wherein the at least one containment barrier overlaps the black matrix.

6. The liquid crystal display device of claim 1, further comprising a first alignment layer on the first substrate and a second alignment layer on the second substrate.

7. The liquid crystal display device of claim 1, the at least one containment barrier includes a tapered side where a convex-concave pattern is disposed; and the pattern includes a tapered side where a convex-concave pattern is disposed.

8. The liquid crystal display device of claim 1, wherein the at least one containment barrier has a tapering angle in a range of about 30 to 90 degrees, and
wherein the pattern has a tapering angle in a range of about 10 to 60 degrees.

9. The liquid crystal display device of claim 1, wherein the at least one containment barrier protrudes from one of the first and second substrates and forms at least one closed loop.

10. The liquid crystal display device of claim 9, wherein the at least one containment barrier forms at least one closed loop surrounding an area smaller than a size of the display area.

11. The liquid crystal display device of claim 9, wherein the at least one closed loop is at least one of a hexagon, a quadrangle, a trapezoid, a lozenge, and a triangle in shape.

12. A liquid crystal display device comprising:
a first substrate comprising a display area and a non-display area surrounding the display area;
a second substrate;
at least one column spacer provided on one of the first and second substrates;
a sealing unit between the first and second substrates, the sealing unit surrounding the non-display area;
a liquid crystal layer interposed between the first and second substrates, the liquid crystal layer surrounded by the sealing unit; and
a first containment barrier disposed on the first substrate in the non-display area between the sealing unit and the at least one column spacer;
a second containment barrier disposed on the second substrate opposite the first containment barrier;
wherein the first and second containment barriers each comprise;
a pair of parallel protrusions forming a loop surrounding the display area; and
a plurality of third protrusions connected between the pair of parallel protrusions.

13. The liquid crystal display device of claim 12, wherein each of the first and second containment barriers further comprise a plurality of fourth protrusions connected between the pair of parallel protrusions such that a loop formed by the pair of parallel protrusions and the plurality of third and fourth protrusions is a closed loop comprising a plurality of lozenge shapes and a plurality of triangular shapes.

14. The liquid crystal display device of claim 12, wherein each of the first and second containment barriers further comprise a plurality of fourth, fifth, sixth and seventh protrusions connected between the pair of parallel protrusions such that a loop formed by the pair of parallel protrusions and the plurality of third, fourth, fifth, sixth and seventh protrusions is a closed loop comprising a plurality of hexagonal shapes and a plurality of trapezoidal shapes.

15. The liquid crystal display device of claim 12, wherein each of the first and second containment barriers further comprise:
a fourth protrusion in parallel with the pair of parallel protrusions; and
a plurality of fifth protrusions connected between the fourth protrusion and the pair of parallel protrusions such that a loop formed by the connected protrusions is a closed loop comprising a first plurality of quadrangle shapes and a second plurality of quadrangle shapes offset from the first plurality of quadrangle shapes.

* * * * *